US012328759B2

(12) United States Patent
Xu et al.

(10) Patent No.: US 12,328,759 B2
(45) Date of Patent: Jun. 10, 2025

(54) TECHNIQUES FOR CHANNEL OCCUPANCY TIME SHARING BETWEEN A USER EQUIPMENT AND A NETWORK ENTITY

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 17/757,477

(22) PCT Filed: Jan. 23, 2020

(86) PCT No.: PCT/CN2020/073951
§ 371 (c)(1),
(2) Date: Jun. 16, 2022

(87) PCT Pub. No.: WO2021/147062
PCT Pub. Date: Jul. 29, 2021

(65) Prior Publication Data
US 2023/0032015 A1    Feb. 2, 2023

(51) Int. Cl.
*H04W 74/0808* (2024.01)
(52) U.S. Cl.
CPC .............. *H04W 74/0808* (2013.01)
(58) Field of Classification Search
CPC .......................... H04W 74/0808; H04W 16/14
See application file for complete search history.

(56) References Cited

U.S. PATENT DOCUMENTS

| 2019/0335456 A1 | 10/2019 | Yerramalli et al. |
| 2020/0053798 A1* | 2/2020 | Tsai ..................... H04W 72/23 |
| 2021/0100030 A1* | 4/2021 | Myung ............. H04W 74/0808 |
| 2021/0105812 A1* | 4/2021 | Rastegardoost .. H04W 74/0808 |

(Continued)

FOREIGN PATENT DOCUMENTS

| CN | 105530647 A | 4/2016 |
| CN | 105636221 A | 6/2016 |

(Continued)

OTHER PUBLICATIONS

OPPO: "Channel Access Procedures for NR-U", R1-1901922, 3GPP TSG RAN WG1 #96, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, XP051599616, 6 Pages, paragraphs [001.], [002.], [2.1.], [2.2.], [005.], [007.], Section 5.

(Continued)

*Primary Examiner* — Afshawn M Towfighi
(74) *Attorney, Agent, or Firm* — Patterson + Sheridan LLP (57) ABSTRACT

Aspects of the present disclosure relate to wireless communications, and more particularly, to techniques for channel access for wireless communications, for example, in unlicensed frequency bands. In some cases, a UE may act as an initiating device, initiating access to a wireless channel if it detects a network entity has failed to access a channel during a channel occupancy time (COT) of a frame period (FP).

35 Claims, 7 Drawing Sheets

(56) References Cited

U.S. PATENT DOCUMENTS

| | | | | |
|---|---|---|---|---|
| 2021/0266961 A1* | 8/2021 | Yerramalli | ............ | H04W 72/21 |
| 2021/0282187 A1* | 9/2021 | Agiwal | ............. | H04W 74/0841 |
| 2021/0307063 A1* | 9/2021 | Yerramalli | .......... | H04W 72/046 |
| 2022/0132569 A1* | 4/2022 | Salah | ................. | H04W 74/0833 |
| 2022/0210827 A1* | 6/2022 | Wang | .................... | H04W 16/14 |

FOREIGN PATENT DOCUMENTS

| | | | |
|---|---|---|---|
| CN | 106851839 A | 6/2017 | |
| CN | 107135490 A | 9/2017 | |
| CN | 109309961 A | 2/2019 | |
| WO | 2019240512 A1 | 12/2019 | |

OTHER PUBLICATIONS

SAMSUNG: "Channel Access Procedures for NR-U", 3GPP TSG-RAN WG1 Meeting #99, R1-1912449, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, pp. 1-13, Nov. 8, 2019, XP051823426, p. 2, Sections 1-7.

Supplementary European Search Report—EP20914879—Search Authority—The Hague—Aug. 22, 2023.

VIVO: "Discussion on the Channel Access Procedures", 3GPP TSG RAN WG1#98bis, R1-1910204, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 4, 2019, 10 Pages, XP051808107, Section 2.1, 2.5, 2.6, figures 7,8.

Charter Communications: "Paging Monitoring in NR-U," 3GPP TSG-RAN WG2 Meeting #107bis, R2-1913651, Oct. 14-18, 2019 (Oct. 18, 2019), 3 pages, the whole document.

International Search Report and Written Opinion—PCT/CN2020/073951—ISA/EPO—Oct. 26, 2020.

Nokia, et al., "Feature Lead's Summary #2 on Channel Access Procedures," 3GPP TSG RAN WG1 Meeting #96, R1-1903705, Feb. 25-Mar. 1, 2019 (Mar. 1, 2019), 23 pages, the whole document.

* cited by examiner

TECHNIQUES FOR CHANNEL OCCUPANCY TIME SHARING BETWEEN A USER EQUIPMENT AND A NETWORK ENTITY

CROSS-REFERENCE TO RELATED APPLICATIONS

This application is a national stage application under 35 U.S.C. 371 of PCT/CN2020/073951, filed Jan. 23, 2020, which is hereby expressly incorporated by reference herein in its entirety as if fully set forth below and for all applicable purposes.

INTRODUCTION

Aspects of the present disclosure relate to wireless communications, and more particularly, to techniques for channel access for wireless communications, for example, in unlicensed frequency bands.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, using shared radio frequency spectrum, which may include unlicensed radio frequency spectrum, has been considered to help solve the spectrum congestion problem for future wireless needs, not only to meet the growing demand for mobile broadband access, but also to advance and enhance the user experience with mobile communications. However, the shared radio frequency spectrum may carry other transmissions, and therefore techniques such as listen before talk (LBT) and clear channel assessment (CCA) may be used in an effort prevent excessive interference.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between wireless communication devices.

Certain aspects provide a method for wireless communications by a user equipment. The method generally includes detecting a network entity has failed to access a channel during a channel occupancy time (COT) of a frame period (FP) of the network entity and initiating access of the channel to start a UE COT in response to the detection, wherein the network entity is allowed to share the channel during the UE COT.

Certain aspects provide a method for wireless communications by a network entity. The method generally includes receiving an uplink transmission from a user equipment (UE) indicating a start of a UE channel occupancy time (COT) after the network entity has failed to access a channel during a COT of a frame period (FP) of the network entity and sharing access to the channel during the UE COT.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this dis

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, to techniques for channel access for wireless communications, for example, in unlicensed frequency bands. In some cases, a UE may act as an initiating device, initiating access to a wireless channel if it detects a network entity has failed to access a channel during a channel occupancy time (COT) of a frame period (FP).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
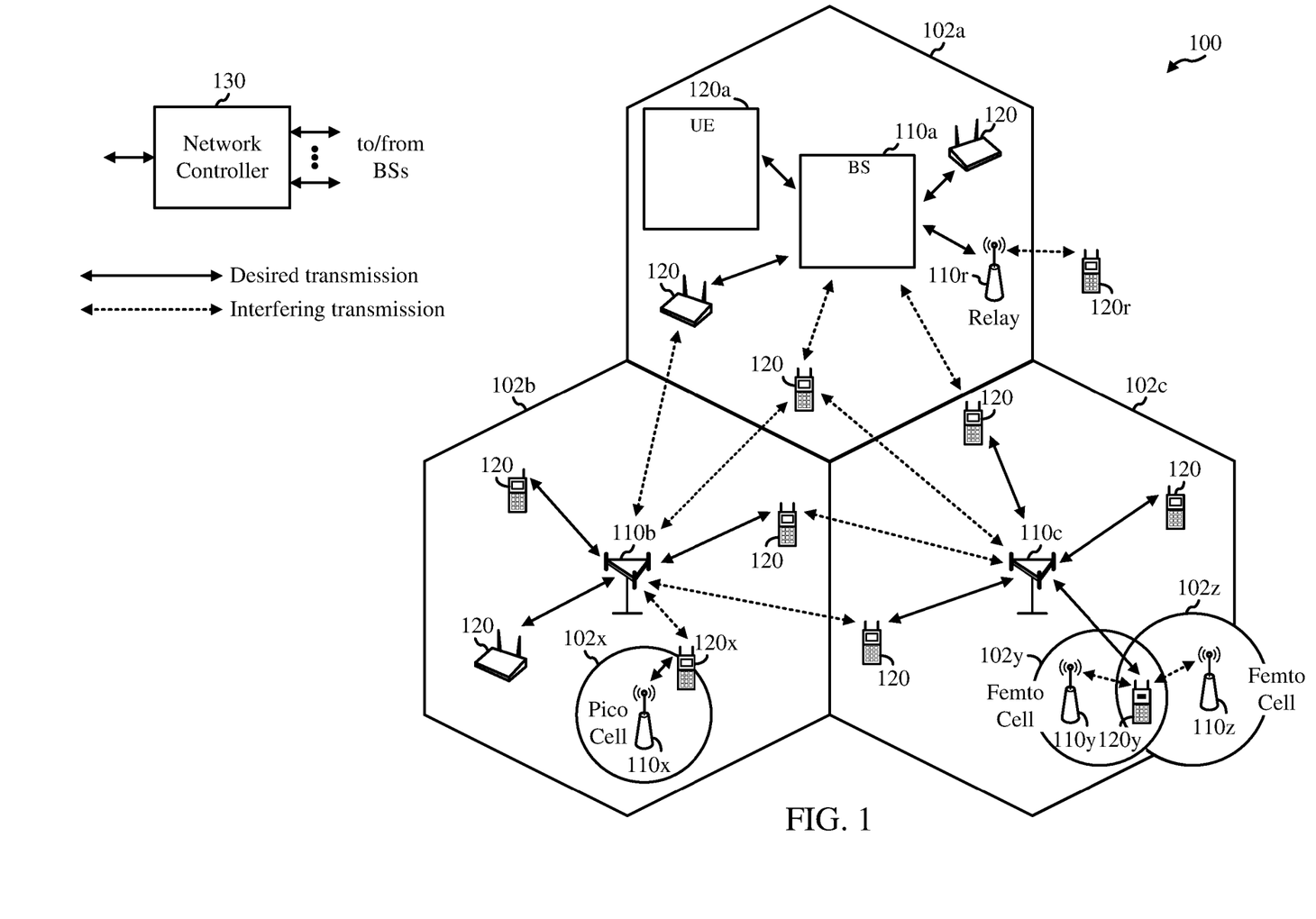
- FIG. 1 is a block diagram conceptually illustrating an example telecommunications system, in which certain aspects of the present disclosure may be implemented.

FIG. 1 illustrates an example wireless communication network 100 in which aspects of the present disclosure may be performed. For example, one or more UEs 120 in the network 100 may be configured to perform operations 400 of FIG. 4. Similarly, base stations 110 (e.g., gNBs) in the network 100 may be configured to perform operations 500 of FIG. 5.

As illustrated in FIG. 1, the wireless communication network 100 may include a number of base stations (BSs) 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a-y* (each also individually referred to herein as UE 120 or collectively as UEs 120) in the wireless communication network 100. The UEs 120 (e.g., 20*x*, 120*y*, etc.) may be dispersed throughout the wireless communication network 100, and each UE 120 may be stationary or mobile.

Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
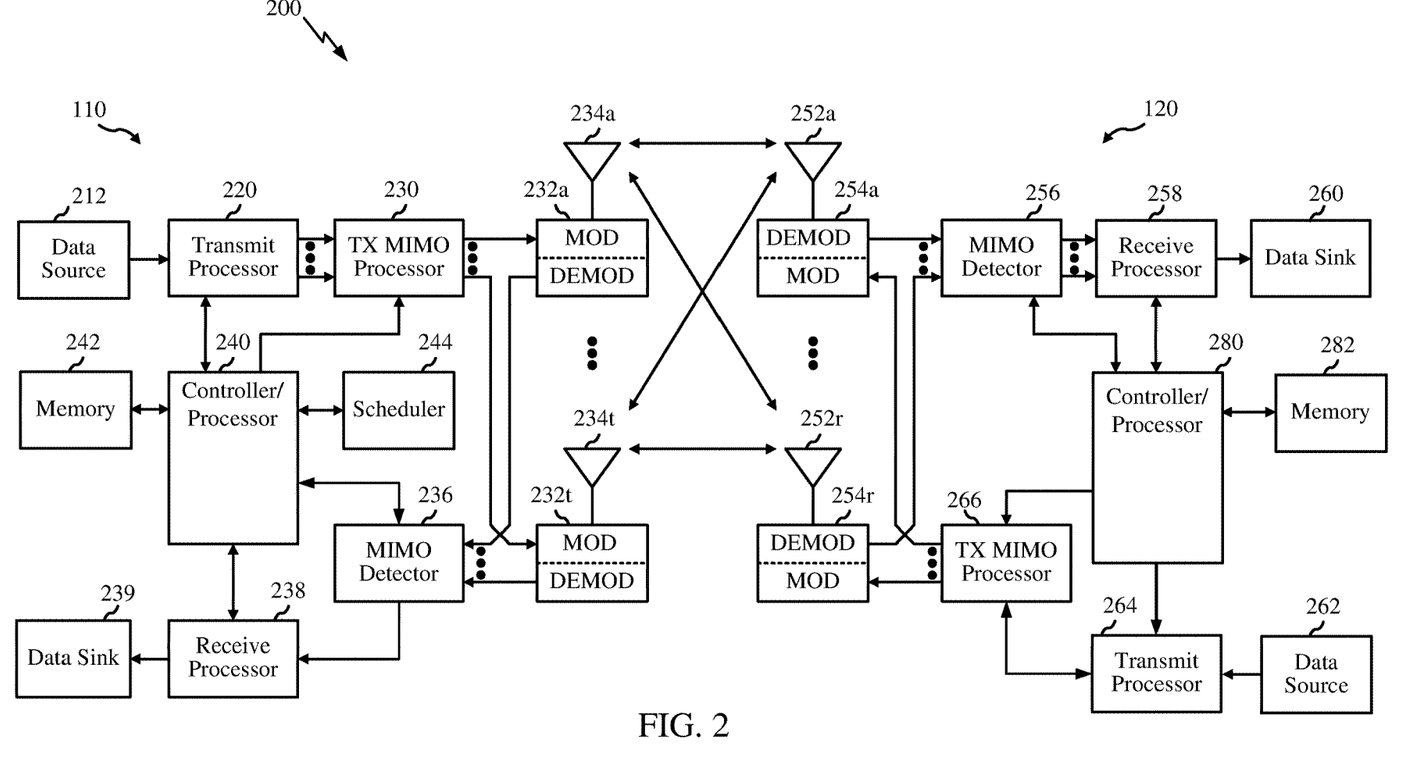
FIG. 2 is a block diagram conceptually illustrating a design of an example a base station (BS) and user equipment (UE), in which certain aspects of the present disclosure may be implemented.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 may be configured to perform operations 400 of FIG. 4. Similarly, antennas 234, processors 220, 230, 238, and/or controller/processor 240 of the BS 110 may be configured to perform operations 500 of FIG. 5.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive downlink signals from the BS 110 or a parent IAB-node, or a child IAB-node may receive downlink signals from a parent IAB-node, and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120 or a child IAB-node, a transmit processor 264 may receive and process data (e.g., for the physical uplink shared channel (PUSCH) or the PSSCH) from a data source 262 and control information (e.g., for the physical uplink control channel (PUCCH) or the PSCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110 or a parent IAB-node.

At the BS 110 or a parent IAB-node, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The controller/processor 280 and/or other processors and modules at the UE 120 may perform or direct the execution of processes for the techniques described herein. The memories 242 and 282 may store data and program codes for BS 110 and UE 120, respectively. A scheduler 244 may schedule UEs for data transmission on the downlink and/or uplink.

Example FBE Scenarios with UE as Initiating Device

In some scenarios where unlicensed frequency bands are used, to help achieve co-existence with other technologies a channel access mechanism referred to as Listen Before Talk (LBT) may be used. LBT generally refers to a contention-based protocol that allows users to share a wireless channel with little or no pre-coordination.

There are different types of LBT schemes, one referred to as Load Based Equipment (LBE) and another referred to as Frame Based Equipment (FBE). According to the LBE scheme, the channel sensing is performed at any time instant and random back-off is used if the channel is found busy.

According to FBE, channel sensing is performed by a base station at fixed time instants, according to a fixed frame period configuration. If the channel is busy, the base station waits a back-off period before again sensing the channel. In some scenarios, such as NR-U (NR unlicensed), the FBE mode of operation may be indicated in remaining minimum system information (RMSI) broadcasts that configure semi-static channel access. The fixed frame period (FFP) configuration may be included in a system information block (e.g., SIB-1) and/or could also be signaled for a UE with UE-specific RRC signaling for FBE secondary cell (sCell) use cases.

Figure 3A:
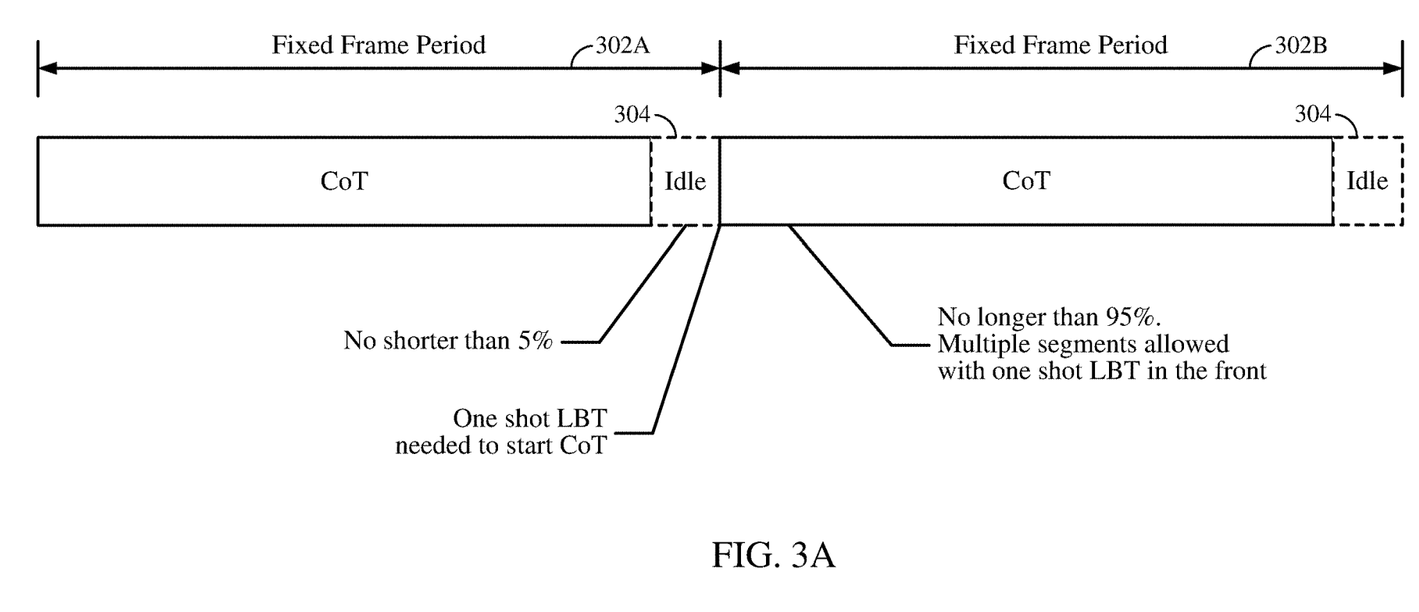
FIG. 3A illustrates an example timing diagram for listen before talk (LBT) mechanism.

FIG. 3A illustrates an example timing diagram for FBE with fixed frame periods (FFPs) that include channel occupancy time (COT) and an idle period. In this example, a gNB may perform LBT (e.g., by applying CCA) at the start of each fixed frame period 302, and may transmit in the frame 302 if the LBT procedure is successful (e.g., if the CCA procedure finds that the channel is clear). The gNB may also perform a short LBT to initiate a transmission in frame 302B.

The fixed frame period is typically restricted to one of set of values:

{1 ms, 2 ms, 2.5 ms, 4 ms, 5 ms, 10 ms}, which includes the idle period. The starting positions of the FFPs within every two radio frames starts from an even radio frame and are given by i*P, where i={0, 1, . . . , 20/P−1} and P is the fixed frame period (in ms). The idle period for a given subcarrier spacing (SCS) is calculated as:

ceil(Minimum idle period allowed by regulations/Ts), where the Minimum idle period allowed is given as:

max(5% of FFP, 100 us), and

Ts is the symbol duration for the given SCS. A PRACH resource is typically considered invalid if it overlaps with the IDLE period of an FFP when FBE operation is indicated. UE transmissions can occur (are allowed) within an FFP if certain downlink signals/channels (e.g., PDCCH, SSB, PBCH, RMSI, GC-PDCCH, . . . ) are detected within the FFP.

Figure 3B:
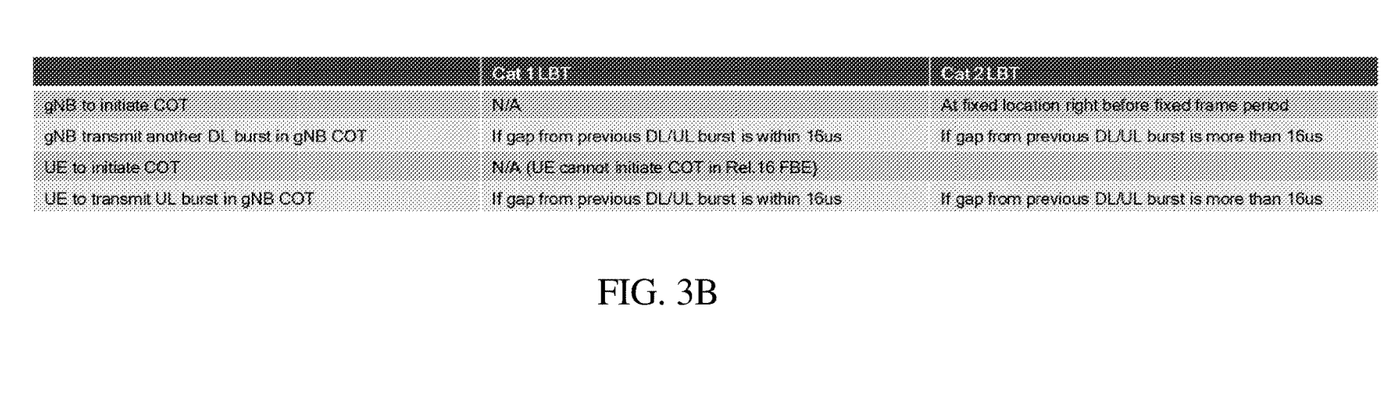
FIG. 3B illustrates example channel access rules.

FIG. 3B illustrates example channel access rules for various types of transmissions according to different LBT categories: Cat 1 (no LBT) and Cat 2 (LBT without random backoff). As illustrated, in Rel.16 NR-U, only a base station (gNB) can act as initiating device, and a UE is only allowed to act as a responding device.

If the network indicates FBE operation, for fallback downlink and/or uplink (DL/UL) grants, for an indication of LBT type of Cat 2 (25 us) or Cat4, the UE follows a mechanism whereby one slot (e.g., a 9 microsecond slot) is measured within a 25 microsecond interval. In such cases, a 2-bit field in an LBE mode may be used to indicate an FBE LBT type, cyclic prefix (CP) extension and channel access priority class (CAPC) indication. Such a field may be re-interpreted, as fallback DCI may be used for RMSI scheduling as well, so the UE may not yet know this is an FBE system.

The rules shown in FIG. 3B may be intended to be aligned with any regulations for FBE operation. It may be noted that a Cat 2 LBT procedure for FBE may be different from a Cat 2 LBT procedure (25 us or 16 us) in LBE. For example, one measurement of 9 us before a transmission may be needed, including at least 4 us to perform the measurement.

Unlicensed bands may be used for a number of different communication service types, such as ultra-reliable low latency communications (URLLC). URLLC generally refers to a service category designed to accommodate emerging services and applications that have stringent latency and reliability requirements. URLLC may be used, for example, in industrial Internet of Things (IIoT) scenarios where devices may be assumed to communication in a controlled environment.

What constitutes a controlled environment may vary. For example, in an extreme case, the environment may be fully controlled such that there will be no other RAT or other operators operating in the coverage. In such an environment, the LBT may virtually always pass. In this case, the system operation may be relatively straightforward. In other words, LBT may not need to be performed at all, but may be performed (e.g., for regulation compliance only), though LBT failures should not be expected.

In a more general case, with less stringent control, although a factory owner/operator may be able to control the environment somewhat, there is still a chance some other RAT is operating with non-zero probability. For example, for a WiFi device, an access probe can be transmitted from a station even when the access point is not deployed (e.g., while the owner/operator can enforce a no WiFi AP deployed in the factory floor, but it may be hard to make sure no employee brings in a device, such as their smart phone).

In such cases, it may be desirable to consider the chance that a gNB LBT fails. In conventional systems (e.g., in Rel.16 NR-U), the gNB may need to skip the entire FFP if the LBT fails and try again next FFP. This may cause a service interruption and is not an ideal result from a resource utilization standpoint.

Aspects of the present disclosure provide techniques that may help address this scenario and provide enhanced resource utilization, allowing a UE to act as initiating device in the case a gNB LBT fails.

In some cases, UEs may be allowed to send uplink transmissions, for example, at RRC configured uplink periods. In such cases, UE transmission of RRC configured transmissions may or may not be conditioned on the detection (by the UE) of the DL signal/channel at the earlier part of the FFP (as such signals may indicate a gNB has gained access to the channel for a channel occupancy time (COT)).

Allowing a UE to serve as an initiating device may allow the UE to send a physical random access channel (PRACH) transmission for initial access, for example, if the FFP structure information is not available in RMSI (SIB1). In this case, the UE does not yet know the FFP structure when transmitting PRACH, so the UE does not know how/when to monitor for a DL signal in order to know if the gNB occupies a COT that covers the potential PRACH transmission occasion. In case the FFP information is included in RMSI, the UE transmission of PRACH may also be conditioned on the detection of a DL signal/channel.

Aspects of the present disclosure provide techniques for using a UE as an initiating device, which may help address the relatively small percentage of cases of LBT failure at the gNB side.

Figure 4:
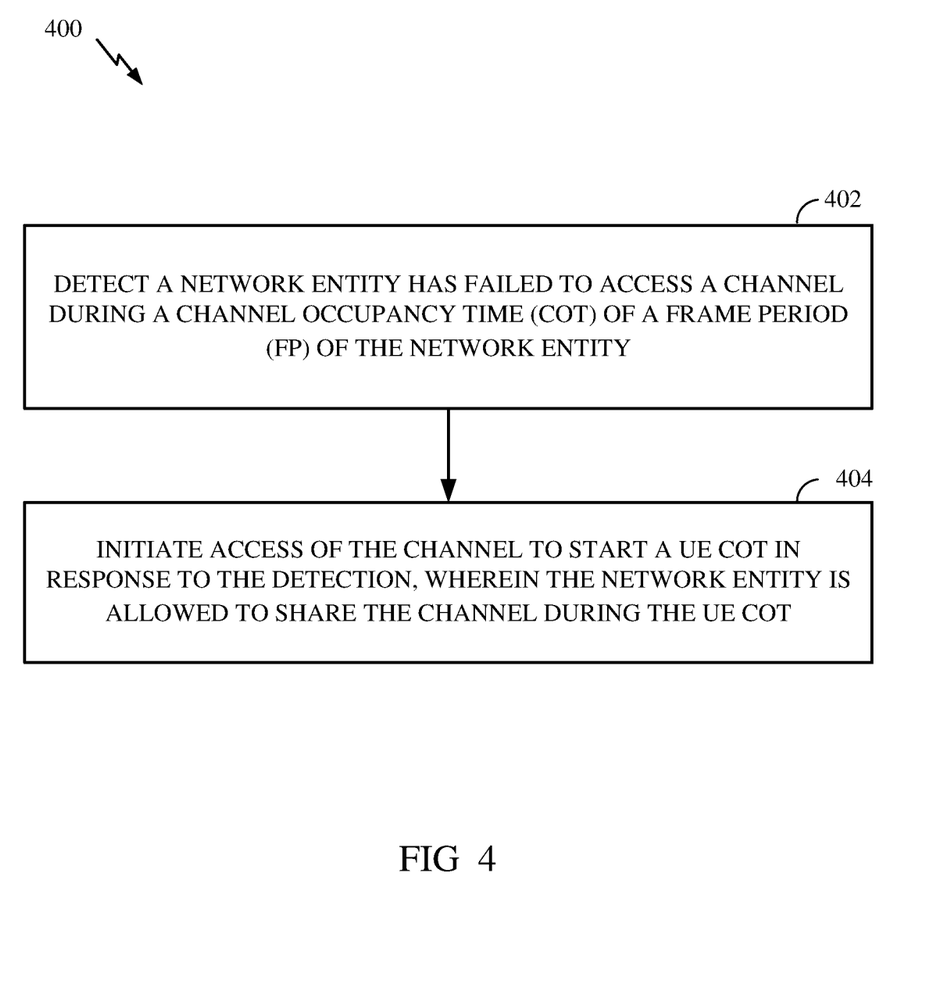
FIG. 4 illustrates example operations for wireless communication by a user equipment, in accordance with various aspects of the disclosure.

FIG. 4 illustrates example operations 400 for wireless communications by a user equipment (UE) to initiate channel access, in accordance with aspects of the present disclosure. For example, operations 400 may be performed by a UE 120 shown in FIGS. 1 and 2.

Operations 400 begin at 402, by detecting a network entity has failed to access a channel during a channel occupancy time (COT) of a frame period (FP) of the network entity. At 404, the UE initiates access of the channel to start a UE COT in response to the detection, wherein the network entity is allowed to share the channel during the UE COT.

Figure 5:
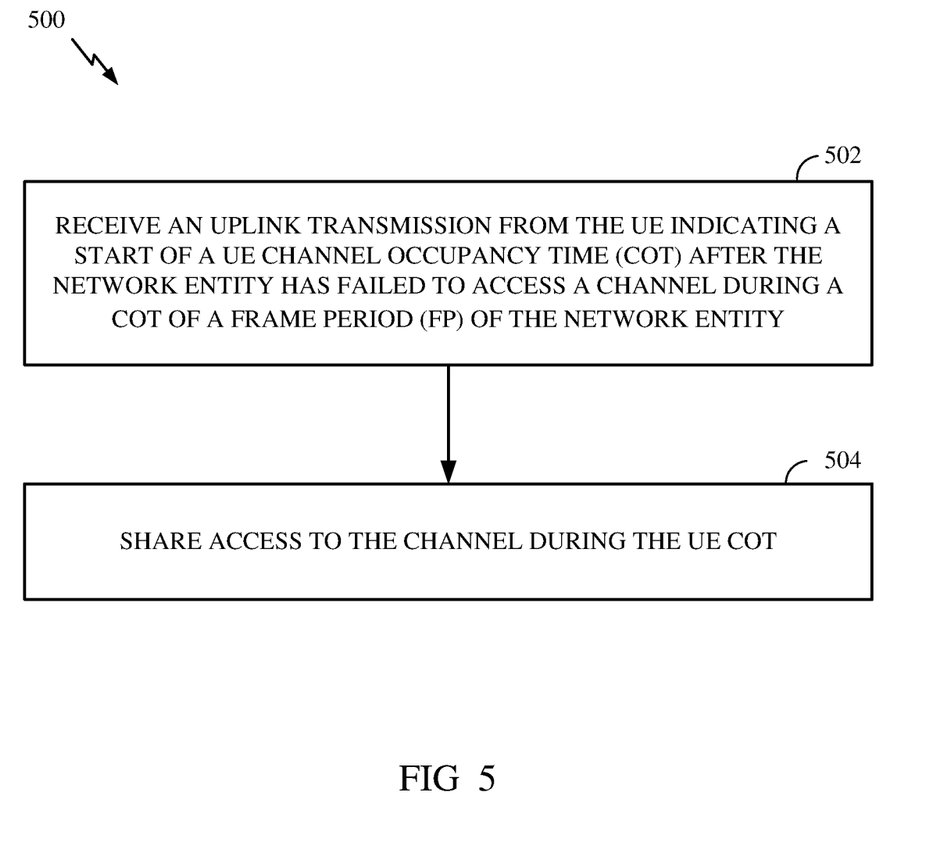
FIG. 5 illustrates example operations for wireless communication by a network entity, in accordance with various aspects of the disclosure.

FIG. 5 illustrates example operations 500 for wireless communications by a network entity, in accordance with aspects of the present disclosure. For example, operations 500 may be performed by a BS 110 (e.g., a gNB) shown in FIGS. 1 and 2 communicating with a UE 120 (performing operations 400 of FIG. 4 to initiate channel access).

Operations 500 begin at 502, by receiving an uplink transmission from a user equipment (UE) indicating a start of a UE channel occupancy time (COT) after the network entity has failed to access a channel during a COT of a fixed frame period (FFP) of the network entity. At 504, the network entity shares access to the channel during the UE COT.

Figure 6:
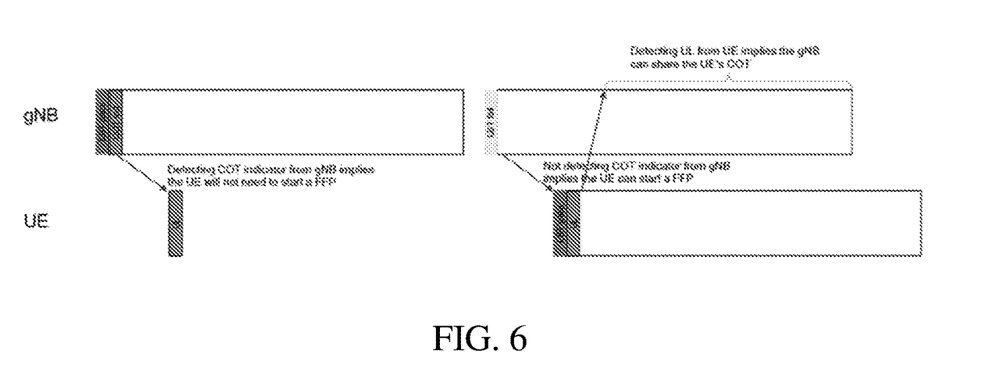
FIGS. 6-8 illustrate example call flow diagrams for channel access scenarios, in accordance with various aspects of the disclosure.

FIG. 6 illustrates one scenario where a UE is allowed act as an initiating device, in accordance with aspects of the present disclosure. As illustrated, in the diagram on the left, if the gNB is able to pass LBT (e.g., as expected), the UE will detect the gNB downlink signal at the beginning of an FFP indicating a gNB COT. In this case, the UE may act like a responding device.

Although the likelihood may be small in many cases, in the event that the gNB failed the LBT to start the FFP, as indicated in the diagram on the right, the UE will not detect the gNB downlink signal at the beginning of an FFP, which implies the UE can start an FFP. In this case, the UE will act as an initiating device and take action to acquire the channel. For example, the UE may perform its own LBT and, if that passes, send its own uplink transmission. Detection of the uplink transmission from the UE implies that the gNB can share the UE's COT (e.g., scheduling transmission to this UE and/or other UEs).

Allowing the UE to initiate access in this manner may allow for better utilization of resources, for example, in case the gNB LBT failed due to an intermittent condition. For example, if the gNB LBT failure is caused by an access probe transmission from a WiFi device, this is a very short burst. When the UE performs its LBT a short time later, the access probe should be gone.

As noted above, the UE COT can be shared with the gNB. In some cases, to enable such sharing, the FFP structure for the UE may need to be configured (e.g., such that the UE and gNB are aligned regarding the FFP timing). In such cases, the UE FFP should start at the configured UL transmission location. The configured FFP length can be the same as the gNB FFP length the UE and gNB FFP lengths could be different.

As noted above, in some cases, there may be a set of RRC configured uplink transmission opportunities (e.g., defined periods within an FFP). It may be desirable, for various reasons, to have only a subset of these uplink transmission opportunities to be configured for supporting a UE-initiated COT. For example, the RRC configured UL transmission opportunities may not be periodic, as might be required for the FFP structure. Multiple configured grant (CG) uplink transmissions may not for a periodic pattern. However, the gNB may need to know when the UE-initiated COT can start and when it should plan on monitoring to detect the UL signal/channel.

One approach to allow the gNB to know when the UE-initiated COT can start is to have the gNB configure which RRC configured UL transmission opportunities a UE can use to initiate a COT. In some cases, there can be a special restriction on the periodicity and location on the RRC configured UL transmission. For example, the period may need to satisfy a length limitation (e.g., 1 ms to 10 ms) and an offset may need to be a certain time later than the start of a gNB FFP, in order to allow the UE time to detect if the gNB gains the COT first.

Certain specific cases may be considered. According to a first specific case, the gNB can configure a subset of all instances of an RRC configured UL transmission opportunity to allow a UE to be able to start a COT. For example, the UE may be allowed to start a COT in the first CG-UL in a gNB FFP after a minimum delay, if there are multiple transmission opportunities of the CG-UL in the gNB FFP.

According to a second specific case, an RRC configured UL transmission opportunity may be configured to be transmitted only if the gNB DL signal/channel indicating the COT is not detected. In this case, the UE should not attempt to transmit the UL signal/channel if in a gNB COT (as indicated by DL signals after a gNB LBT).

According to a third specific case, a dedicated UL transmission can be configured for the UE to contend for the COT at a certain time if the gNB COT is not detected. For example, this dedicated UL transmission may be not carry any additional information.

In any of these cases, when a gNB fails LBT at the beginning of the COT, due to configuration, the gNB will know when (where within an FFP) to monitor to detect the UE UL signal/channel that indicates if the UE has the COT.

Figure 7:
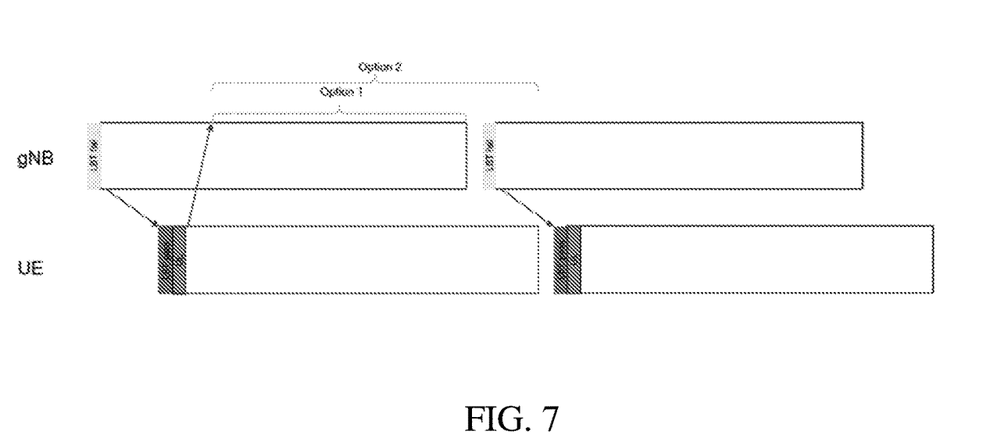

As illustrated in FIG. 7, there are various options for how long a gNB can share the UE COT. For example, according to a first option (labeled Option 1 in FIG. 7), the sharing of the UE COT may end at the gNB FFP boundary, before the gNB tries another time for the COT for the next FFP. In this case, if the LBT somehow failed again, at the beginning of the next FFP, the gNB cannot transmit as well (as the beginning of the gNB FFP overlaps with the UE COT).

According to a second option (labeled Option 2 in FIG. 7), the sharing of the UE COT may end at the UE FFP boundary. As illustrated, at the gNB FFP boundary, the gNB may again try to initiate its own COT. If this LBT is successful, the system will resume normal operation (with the gNB as initiating device). If this LBT also fails, the gNB can continue to share the UE's COT, at least until the UE again contends for the channel for the next UE FFP.

In LBE mode, a UE may initiate a COT and share it with a gNB. In such cases, the COT is typically not allowed to be shared with other UEs.

Aspects of the present disclosure, however, allow a UE initiated COT (after the UE detects a failed gNB LBT) to be shared with other UEs. There are various options to allow a UE initiated COT to be shared with other UEs.

According to a first option (Option 1), the COT may be allowed to be shared for other UEs. For example, since a controlled environment is assumed, other devices/networks (e.g., WiFi) may not be impacted. For other UEs to share the COT, they may need to detect some signal/channel from the gNB. In such a case, the UEs sharing the COT may not need to distinguish or know the COT was UE or gNB initiated (although the signal/channel detected is not at the beginning of the gNB FFP), and may naturally assume they can share the COT when they detect the gNB signal.

According to a second option (Option 2), the COT may not be allowed to be shared to other UEs for certain purposes (e.g., data transmission). In this case, the other UEs may need to be able to tell that the COT is not initiated by the gNB (and its use is restricted).

According to one sub-option (Option 2.1), the signal/channel detected to indicate the COT may carry information that the gNB is not the owner of the FFP, so other UEs can know not to transmit. In some cases, a bit may be added to a DCI format (e.g., 2_0), to differentiate the transmission is in a gNB initiated COT or in a shared COT initiated by a UE.

According to another sub-option (Option 2.2), UE behavior may be defined such that, if the signal/channel detected is at the beginning of the COT (or more generally a set of time locations within the FFP), the UE treats the signal as indicating a gNB COT. On the other hand, if the signal/channel detected is not at the beginning of the COT (or more specifically at another set of time locations within the FFP), the UE may treat the signal as indicating a shared COT.

In some scenarios, it may be desirable to allow multiple UEs to act as initiating devices. For example, this may be especially useful when a gNB cannot share the COT with other UEs.

Figure 8:
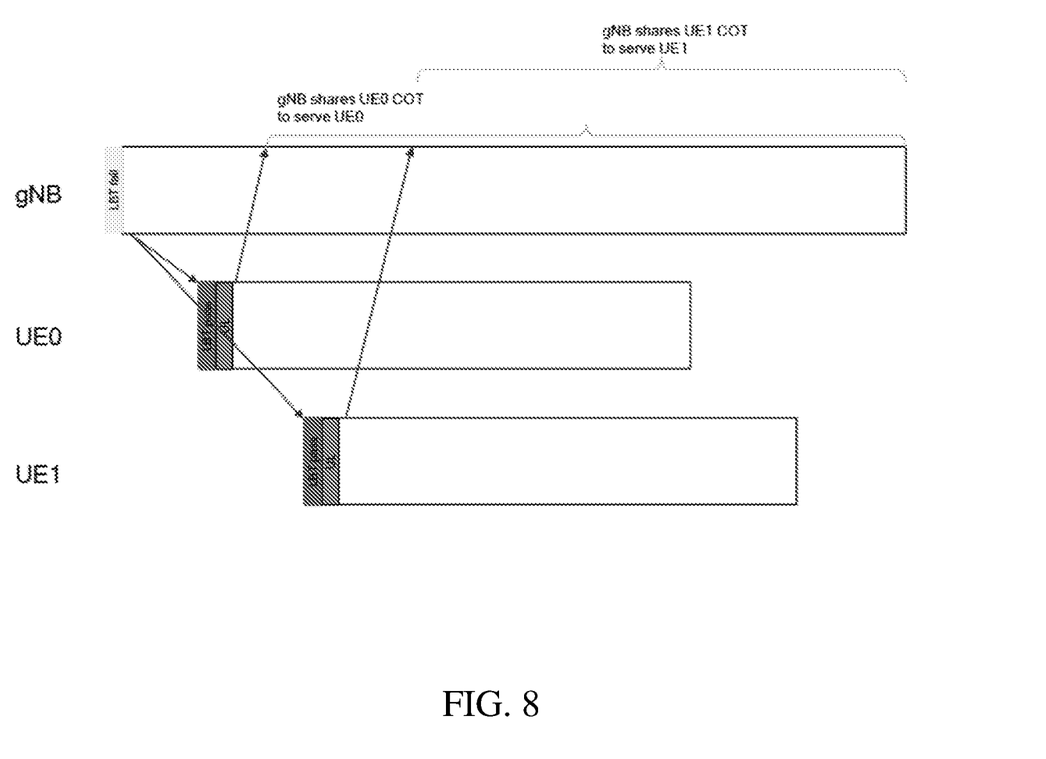

As illustrated in FIG. 8, in such cases, more than one UE can contend for the channel and start their own FFP. In such cases, the gNB may share one or all of these UE COTs. In the illustrated example, two UEs, UE0 and UE1 each initiate their own COT. As illustrated, for overlapping portions of the UE COTs, the gNB can serve both UEs.

As described herein, allowing UEs to initiate access in the event a gNB fails an LBT in one FFP may result in better utilization of resources than if the gNB had to wait for a subsequent FFP.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system. For example, in some cases, processors such as those shown in FIG. 2 may be configured to perform operations 400 of FIG. 4 and/or operations 500 of FIG. 5.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 4-5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   detecting a network entity has failed to access a channel during a channel occupancy time (COT) of a frame period (FP) of the network entity; and
   initiating access of the channel to start a UE COT in response to the detection, wherein the network entity is allowed to share the channel during the UE COT.

2. The method of claim 1, wherein initiating access to the channel comprises:
   performing a listen before talk (LBT) procedure; and
   sending an uplink transmission to notify the network entity of the UE COT.

3. The method of claim 2, further comprising determining a period to send the uplink transmission.

4. The method of claim 3, wherein:
   the period is determined based on a radio resource control (RRC) configuration of one or more uplink transmission periods.

5. The method of claim 4, wherein the determined period occurs at least a determined period after a start of the FP of the network entity.

6. The method of claim 4, wherein:
   the uplink transmission is sent in one of a subset of the uplink transmission periods available to start a UE COT.

7. The method of claim 4, wherein:
   the uplink transmission is sent in a period reserved for uplink transmission only if the network entity has failed to access a channel during the COT of the FP of the network entity.

8. The method of claim 4, wherein:
   the uplink transmission is sent in an uplink transmission period dedicated for the UE to contend for the channel if the UE detects the network entity has failed to access the channel during the COT of the FP of the network entity.

9. The method of claim 1, wherein:
   the network entity is allowed to share the channel until a boundary of a subsequent FP of the network entity.

10. The method of claim 1, wherein:
    the network entity is allowed to share the channel until an end of the UE COT.

11. The method of claim 1, wherein:
    one or more other UEs are also allowed to share the channel during the UE COT.

12. The method of claim 11, wherein:
one or more other UEs are not allowed to share the channel during the UE COT at least for data transmission.

13. The method of claim 12, wherein:
the network entity transmits one or more signals indicating the network entity is not an owner of the UE COT.

14. The method of claim 13, wherein the one or more signals are conveyed via a downlink control information (DCI).

15. The method of claim 12, wherein detection that the network entity has failed to access a channel during a beginning of the COT of the FP of the network entity indicates the UE COT is a shared COT.

16. A method for wireless communications by a network entity, comprising:
receiving an uplink transmission from a user equipment (UE) indicating a start of a UE channel occupancy time (COT) associated with a channel in response to the network entity failing to access the channel during a COT of a frame period (FP) of the network entity; and
sharing access to the channel during the UE COT.

17. The method of claim 16, wherein failing to access the channel comprises failing a listen before talk (LBT) procedure.

18. The method of claim 17, further comprising determining a period to monitor for the uplink transmission from the UE.

19. The method of claim 18, wherein:
the period is determined based on a radio resource control (RRC) configuration of one or more uplink transmission periods.

20. The method of claim 19, wherein the determined period occurs at least a determined period after a start of the FP of the network entity.

21. The method of claim 19, wherein:
the uplink transmission is sent in one of a subset of the uplink transmission periods available to start a UE COT.

22. The method of claim 19, wherein:
the uplink transmission is sent in a period reserved for uplink transmission only if the network entity has failed to access a channel during the COT of the FP of the network entity.

23. The method of claim 19, wherein:
the uplink transmission is sent in an uplink transmission period dedicated for the UE to contend for the channel if the UE detects the network entity has failed to access the channel during the COT of the FP of the network entity.

24. The method of claim 16, wherein:
the network entity is allowed to share the channel until a boundary of a subsequent FP of the network entity.

25. The method of claim 16, wherein:
the network entity is allowed to share the channel until an end of the UE COT.

26. The method of claim 16, wherein:
one or more other UEs are also allowed to share the channel during the UE COT; and
the network entity serves the one or more other UEs during the UE COT.

27. The method of claim 26, wherein:
one or more other UEs are not allowed to share the channel during the UE COT at least for data transmission.

28. The method of claim 27, further comprising:
transmitting one or more signals indicating the network entity is not an owner of the UE COT.

29. The method of claim 28, wherein the one or more signals are conveyed via a downlink control information (DCI).

30. An apparatus for wireless communications by a user equipment (UE), comprising:
means for detecting a network entity has failed to access a channel during a channel occupancy time (COT) of a frame period (FP) of the network entity; and
means for initiating access of the channel to start a UE COT in response to the detection, wherein the network entity is allowed to share the channel during the UE COT.

31. An apparatus for wireless communications by a network entity, comprising:
means for an uplink transmission from a user equipment (UE) indicating a start of a UE channel occupancy time (COT) associated with a channel in response to the network entity failing to access the channel during a COT of a frame period (FP) of the network entity; and
means for sharing access to the channel during the UE COT.

32. An apparatus for wireless communications by a user equipment (UE), comprising:
at least one processor and a memory configured to detect a network entity has failed to access a channel during a channel occupancy time (COT) of a frame period (FP) of the network entity; and
initiate access of the channel to start a UE COT in response to the detection, wherein the network entity is allowed to share the channel during the UE COT.

33. An apparatus for wireless communications by a network entity, comprising:
at least one processor and a memory configured to
receive an uplink transmission from a user equipment (UE) indicating a start of a UE channel occupancy time (COT) after the network entity has failed to access a channel during a COT of a frame period (FP) of the network entity; and
share access to the channel during the UE COT.

34. A non-transitory computer-readable medium for wireless communications, comprising
instructions that, when executed by one or more processors of a user equipment (UE), cause the UE to:
detect a network entity has failed to access a channel during a channel occupancy time (COT) of a frame period (FP) of the network entity; and
initiate access of the channel to start a UE COT in response to the detection, wherein the network entity is allowed to share the channel during the UE COT.

35. A non-transitory computer-readable medium for wireless communications, comprising
instructions that, when executed by one or more processors of a network entity, cause the network entity to:
receive an uplink transmission from a user equipment (UE) indicating a start of a UE channel occupancy time (COT) after the network entity has failed to access a channel during a COT of a frame period (FP) of the network entity; and
share access to the channel during the UE COT.

* * * * *